June 16, 1959 M. A. LANCUCKI ET AL 2,891,141
INSTRUMENT DIAL ILLUMINATOR
Filed June 13, 1955
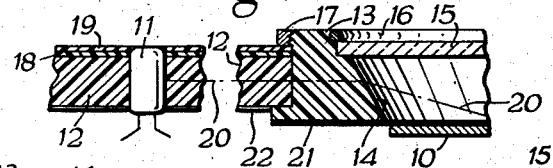
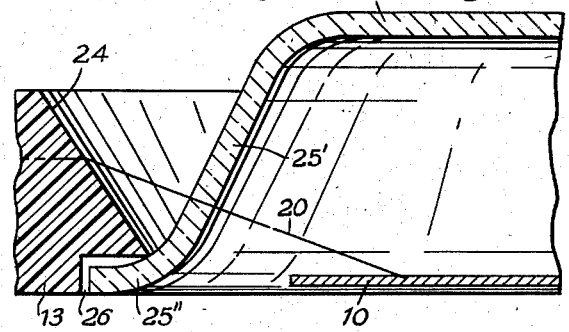
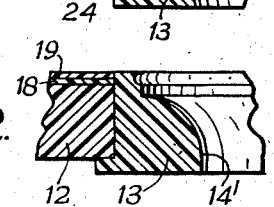
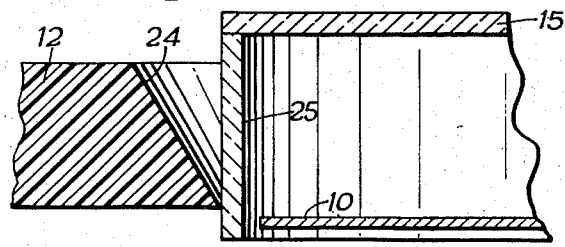
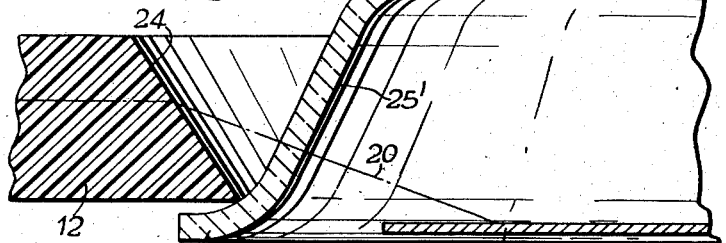
INVENTORS
MARION ALEKSANDER LANCUCKI AND JOHN WILLIAM STRANGE
BY
Hall and Houghton
ATTORNEYS

United States Patent Office 2,891,141
Patented June 16, 1959

2,891,141
INSTRUMENT DIAL ILLUMINATOR

Marian Aleksander Lancucki and John William Strange, London, England, assignors to Thorn Electrical Industries Limited, London, England Application June 13, 1955, Serial No. 515,186

Claims priority, application Great Britain June 18, 1954

6 Claims. (Cl. 240—8.16)

The present invention relates to the illumination of surfaces, such as the surfaces of instrument dials, by means of light having a general direction which is nearly parallel to the surfaces. An example is an instrument dial arranged in an aperture in a trans-illuminated panel of light-transmitting material, such as clear methyl methacrylate, the trans-illumination being produced by a light source arranged in a further aperture in the panel and being transmitted directly or by reflection in directions generally parallel to the major surfaces or light guiding forces of the panel.

When, as in the example referred to, the light is in directions nearly parallel to the surface to be illuminated, some difficulty is experienced in arranging for adequate illumination. When light is applied to a dial, as hereinbefore mentioned, through a trans-illuminated panel, it is known to incline the edge of the panel surrounding the dial at about 30° to the normal to the major surfaces of the panel. In this way advantage is taken of the refraction of the emergent light to deflect the light in such a manner that its average angle of incidence upon the surface of the dial is less than in the absence of the refraction (that is to say the average angle between the incident light and the dial surface is greater).

However it is usually necessary to provide the dial with a transparent cover of glass or other suitable material having a smooth and therefore highly reflecting surface, and even with the decreased angle of incidence produced by the refraction, more than 50% of the light is reflected from the surface of the cover and is not only wasted so far as illumination of the dial is concerned, but may result in distraction of the eye of an observer and a reduction in contrast.

According to the present invention in one aspect, there is provided in combination, a member, such as an instrument dial, having a surface to be illuminated by light approaching from a direction generally parallel, or nearly parallel, to the surface, a transparent cover through which the surface can be observed and which is spaced from the said surface, and, positioned to pass light into the space between the said surface and the cover, a body of light-transmitting and refracting material having light guiding faces and an edge or light delivering face therebetween forming at least part of the outer boundary of the said space and inclined with respect to the normal to the said surface at an angle or at angles such that light entering the said body from the outside (through a light receiving face between the light guiding faces and remote from the light delivering face) and guided thereby in a direction parallel to the said surface is refracted towards the said surface as it leaves the light delivering face. In this way not only is advantage taken of refraction, as in the known arrangement referred to, in order to decrease the angle of incidence of the light upon the said surface, but reflections from the inside of the cover tend to augment the illumination of the said surface.

The said body may be in the form of a bezel surrounding the space between the said surface and the cover. The outer or light receiving edge of the body may be parallel to the normal to the said surface or it may be inclined to the normal, for instance in such a manner as to increase the bending of light towards the said surface.

The arrangement according to the invention as set forth may be used in conjunction with one or more lamps arranged near the outer or light receiving edge of the said body, but, preferably, it is arranged in an aperture in a trans-illuminated panel.

According to the present invention, in a further aspect, there is provided in combination, a member, such as an instrument dial, having a surface to be illuminated, a transparent cover through which the surface can be observed and which is spaced from the said surface, and surrounding at least part of the space between the said member and the cover a body adapted to transmit light by trans-illumination into the said space, the edge of the said body adjacent the said space being inclined with respect to the normal to the said surface in such a manner that light emerging from the said edge is refracted towards the said surface and away from the cover.

The said edge may be that of an aperture in a trans-illuminated panel and the cover may have a rearward-turned rim portion extending through the aperture and so shaped as to be traversed approximately normally by light from the said body illuminating the said surface. Alternatively the said edge of the body may be formed in a member separate from the said body and constituting a bezel.

According to the invention in yet another aspect, a member, such as an instrument dial, to be illuminated is arranged in an aperture of frusto-conical shape in a trans-illuminated panel, or opposite the aperture and slightly behind the plane of the rear surface of the panel, and a transparent cover is provided extending over the said member and having a rearwardly-turned rim extending into said aperture and approximately to or beyond the said plane, the arrangement being such that light from the panel is refracted towards the said member and traverses the said rim in a direction substantially normal to the surfaces thereof or at least at a small angle to the normal.

The term frusto-conical shape is intended to be read widely to include not only circular apertures but apertures of other shapes.

The rim may extend at right angles to the part of the cover overlying the said member and may be either integral with or separate from and fixed to the said part. Such an arrangement has, however, the disadvantage for some purposes that visibility of the said member through the part of the cover near the rim is impaired by refraction due to the change in thickness.

Preferably, therefore, the whole cover including the rim is of uniform thickness, the edge of the cover being rearwardly-turned in a smooth curve. Although the part of the rim beyond the curve may, in this case also, project at right angles to the part of the cover overlying the said member, preferably it is turned rearwardly through less than a right angle. Part of the rim may extend beyond the rear face of the panel and this part may be outwardly-turned, in which case the rim has an elongated S shape in cross-section.

The invention will be described by way of example with reference to the accompanying drawing in which Fig. 1 is a view in cross-section of a part of a trans-illuminated panel and an associated instrument dial constructed and arranged in accordance with the present invention, and Figs. 2 to 6 are cross-sectional views of modifications of part of Fig. 1 in accordance with the invention.

Referring to Fig. 1, an instrument dial 10, which will be assumed to be horizontal, is required to be illuminated by light from one or more light sources 11 arranged in apertures in a transparent panel 12, for example of methyl methacrylate. Fixed with respect to, and projecting upward around, the periphery of the dial 10 is a bezel 13 of transparent material, such for example as methyl methacrylate, the inner face or edge of the bezel 14 being frusto-conical with its smaller diameter near the dial 10. A recess is formed in the upper end of the bezel to receive a cover glass 15 which is held in the recess in any convenient way such as by a spring ring 16.

The outer face or edge of the bezel 13 is vertical and fits snugly in a circular aperture in the panel 12 where it is held in any convenient way, for instance by an externally-threaded ring 17. The upper surface of the panel 12 is rendered opaque, for example by covering it with a layer of white opal plastic 18 which layer is covered with a layer of an opaque plastic 19.

Light entering the bezel 13 in a generally horizontal direction as indicated by the line 20 is refracted at the inner surface of the bezel towards the dial 10 and away from the cover glass 15. In this way the average angle of incidence upon the dial is decreased.

In order to reduce the amount of light entering through the bezel that is reflected from the cover on to the opposite surface of the bezel, the under surface of the bezel is preferably rendered substantially non-reflecting, for example by blackening as indicated at 21. The under surface of the panel in a region close to the bezel may also be rendered substantially non-reflecting for the same purpose as indicated at 22.

By means of the arrangement described, the illumination of the dial 10 is increased not only by the decreased angle of incidence of the light thereon but also by the light reflected from the rear surface of the cover 15, part of which increases the dial illumination. Thus a higher proportion of the light transmitted through the panel is usefully employed and far less light is scattered to produce unwanted reflections and reduction in contrast.

Instead of making the inner edge of the bezel frustoconical, and thus with a uniform angle to the vertical over its whole surface, it may be formed at two or more different angles, or of curved shape in cross-section. In such cases the shape may be convex as shown at 14' in Fig. 2 thus producing approximately the effect of a convex lens.

As shown in Fig. 3, the outer surface 23 of the bezel and/or the corresponding edges surface 24 of the aperture in the panel may be other than vertical. Whereas, in Fig. 3, the outer surface 23 of the bezel is inclined relatively to the edge surface 24 of the aperture, what may be called an "air lens" is formed between the surfaces. This space may, if desired, be filled with material of low refractive index.

In the arrangement of Fig. 4 the panel 12 has an aperture 24 of frusto-conical shape and the transparent cover 15 has a rearwardly-turned rim 25 extending through the aperture. The rim 25 may be integral with or separate from the cover 15. The dial 10 is placed slightly behind the rear of the panel 12.

In the modification of Fig. 4 shown in Fig. 5, the transparent cover 15' has a rim 25' of elongated S shape in cross-section, such that the part within the aperture 24 is inclined oppositely to the edge of the aperture and the outer part 25" of the rim extends behind the rear face of the panel 12. As indicated by the line 20, the light from the panel 12 is arranged to pass through the portion 25' approximately normal to the surface thereof.

The portion of the panel shown in Fig. 5 immediately around the aperture 24 may be replaced by a bezel 13 such as is shown in Figs. 1, 2 or 3 set into an aperture in the panel. As shown in Fig. 6, the outer edge 25" of the cover 15' may be inset into a recess 26 formed in the rear surface of the bezel.

We claim:

1. An indicating instrument having a dial, a transparent cover through which said dial is viewed mounted parallel to and in spaced relation to said dial, and illuminating means for said dial comprising a body of transparent light refracting material at least partially surrounding the space between said dial and said cover, said body having light guiding surfaces generally parallel to said dial, a light delivering face extending between said light guiding surfaces at the portion of the body proximate to said dial, and a light receiving face between said guiding surfaces and remote from said light delivering face for transmitting light into said body, said light delivering face flaring outwardly and upwardly away from said dial thereby refracting toward said dial light delivered from said light delivering face, said transparent cover having a transparent rim portion extending rearwardly therefrom toward the plane of said dial and across the path of light delivered from said light delivering face at a steep angle to the plane of said dial.

2. The invention of claim 1, said transparent body forming a bezel, and said transparent cover having its said rim portion extending through said bezel.

3. The invention of claim 1, in which said rim portion has a marginal portion set into a recess in the rear surface of said bezel.

4. The invention of claim 1, said body of transparent light refracting material comprising a portion of a trans-illuminated panel, and said light delivering face forming the boundary of an aperture in said panel.

5. The invention of claim 4, said transparent cover having its said rim portion extending into said aperture across the path of light delivered from said light delivering face substantially normal to said path.

6. The invention of claim 5, said transparent cover constituting a central portion generally parallel to and substantially co-extensive with said dial, the rim portion of said cover having a cross-section of elongated S-shape and extending outwardly and rearwardly from said central portion and thence outwardly to form a marginal portion substantially parallel to the plane of said central portion.

References Cited in the file of this patent

UNITED STATES PATENTS

| | | |
|---|---|---|
| 2,259,910 | Ryslsky | Oct. 21, 1941 |
| 2,537,971 | Dames | Jan. 16, 1951 |
| 2,695,354 | Neugass | Nov. 23, 1954 |